US010843151B2

(12) United States Patent
Kurian (10) Patent No.: US 10,843,151 B2
(45) Date of Patent: Nov. 24, 2020

(54) MIXING AND DISPENSING APPARATUS TO OBTAIN SEMI-LIQUID FORM OF A POWDER MATERIAL

(71) Applicant: ALGIMATE DENTAL SYSTEMS PRIVATE LIMITED, Kerala (IN)

(72) Inventor: Binnoy Kurian, Ernakulam (IN)

(73) Assignee: Algimate Dental Systems Private Limited, Kerala (IN)

( * ) Notice: Subject to any disclaimer, the term of this patent is extended or adjusted under 35 U.S.C. 154(b) by 0 days.

(21) Appl. No.: 16/466,343

(22) PCT Filed: May 8, 2018

(86) PCT No.: PCT/IN2018/050285
§ 371 (c)(1),
(2) Date: Jun. 4, 2019

(87) PCT Pub. No.: WO2018/207207
PCT Pub. Date: Nov. 15, 2018

(65) Prior Publication Data
US 2020/0078752 A1  Mar. 12, 2020

(30) Foreign Application Priority Data
May 9, 2017 (IN) .............................. 201741016276

(51) Int. Cl.
*B01F 15/02* (2006.01)
*A61C 9/00* (2006.01)
(Continued)

(52) U.S. Cl.
CPC ........ *B01F 15/0237* (2013.01); *A61C 9/0026* (2013.01); *B01F 3/12* (2013.01);
(Continued)

(58) Field of Classification Search
CPC .......... B01F 15/00896; B01F 15/00746; B01F 9/0001; B01F 15/00824; B01F 15/00831;
(Continued)

(56) References Cited

U.S. PATENT DOCUMENTS 6,099,160 A * 8/2000 Flackett ............ B01F 15/00824
366/217
7,201,512 B2 * 4/2007 Suzuki ................ B01F 11/0005
366/217
(Continued)

FOREIGN PATENT DOCUMENTS

JP    2009208026 A  *  9/2009
JP    2010-179265     *  8/2010
(Continued)

*Primary Examiner* — Charles Cooley
(74) *Attorney, Agent, or Firm* — Occhiuti & Rohlicek LLP (57) ABSTRACT

A mixing and dispensing apparatus to facilitate automatic mixing and dispensing of a semi-liquid form of a powder material when mixed with a fluid. The apparatus comprises a mechanism to hold and rotate a cartridge, an actuation device, and an injection unit. The cartridge consists of the powder material to be mixed with the fluid. The mechanism rotates the cartridge about a primary axis of rotation and a secondary axis of rotation to uniformly mix the powder material with the fluid. The actuation device performs a piercing stroke to pierce one end of the cartridge, and a dispensing stroke to dispense the semi-liquid form of the powder material through an opposing end of the cartridge. Further, the injection unit is disposed within the actuation device to inject a pre-determined quantity of fluid into the cartridge following piercing stroke.

17 Claims, 5 Drawing Sheets

(51) Int. Cl.
*B01F 3/12* (2006.01)
*B01F 9/00* (2006.01)
*B01F 15/00* (2006.01)

(52) U.S. Cl.
CPC ...... *B01F 9/0001* (2013.01); *B01F 15/00396* (2013.01); *B01F 15/00409* (2013.01); *B01F 15/00422* (2013.01); *B01F 15/029* (2013.01); *B01F 2215/0027* (2013.01)

(58) Field of Classification Search
CPC ................. B01F 9/0003; B01F 9/0021; B01F 2009/0067; B01F 2015/0011; B01F 2015/00642; B01F 15/00435; B01F 2015/00623; B01F 15/0237; B01F 3/12; B01F 15/00409; B01F 15/00396; B01F 15/00422; B01F 15/029; B01F 2215/0027; A23G 9/086; A23G 9/106; A23G 9/22; A23G 9/08; A23G 9/224; G05B 15/02; A23V 2002/00; B04B 5/02; B04B 9/14; B04B 9/12; B04B 5/0414; B04B 5/0421; B04B 5/10; B02C 17/08; A61C 9/0026

USPC .......... 366/209–219; 494/19; 433/49, 90, 91
See application file for complete search history.

(56) References Cited

U.S. PATENT DOCUMENTS

| | | | |
|---|---|---|---|
| 8,092,075 B2 * | 1/2012 | Ishii | B01D 19/0052 366/139 |
| 8,684,229 B2 * | 4/2014 | Harre | A61C 9/0026 222/1 |
| 2005/0282104 A1 * | 12/2005 | Suzuki | B01F 11/0005 433/49 |
| 2007/0025180 A1 * | 2/2007 | Ishii | B01D 19/0052 366/139 |
| 2020/0078752 A1 * | 3/2020 | Kurian | B01F 15/00409 |

FOREIGN PATENT DOCUMENTS

| | | | |
|---|---|---|---|
| JP | 2011045873 A | * | 3/2011 |
| WO | 2018/207207 A1 | * | 11/2018 |

* cited by examiner

MIXING AND DISPENSING APPARATUS TO OBTAIN SEMI-LIQUID FORM OF A POWDER MATERIAL

CROSS-REFERENCE TO RELATED APPLICATIONS

This application is the national phase under 35 USC 371 of international application no. PCT/IN2018/050285, filed May 8, 2018, which claims the benefit of the priority date of Indian application no. 201741016276, filed May 9, 2017. The contents of the aforementioned applications are incorporated herein by reference in their entireties.

TECHNICAL FIELD

The present disclosure relates to a field of mixing devices. Particularly but not exclusively relates to a mixing and dispensing apparatus for use in dentistry and orthodontics. Embodiments of the disclosure disclose to an apparatus for mixing and dispensing of alginate compound for making dental impression material.

BACKGROUND

In general, dentists use a paste form, primarily an alginate paste to take a desired dental impression of a subject. Typically, the alginate paste may be obtained by mixing a liquid such as water with an alginate powder manually in adequate proportions. The mixed paste is transferred manually into a mould, after which the mould may be positioned around the teeth of the subject and allowed to solidify to obtain the desired dental impression. Obtaining a homogenous alginate paste by manual mixing is a time consuming and laborious task. Further, manual mixing requires skill and technique to obtain the alginate paste without any inconsistency and wastage.

With ongoing efforts, many apparatuses have been developed to mix the alginate powder and the liquid to obtain alginate paste having desired consistency. The conventional apparatuses comprise a mixing container, wherein adequate amount of the alginate powder and liquid may be added. The mixing container may be rotated to obtain the alginate paste. Further, the alginate paste is manually taken out from the container and transferred into the mould.

Though manual mixing is eliminated by the conventional apparatuses, the addition of material in the mixing container and dispensing of the paste still requires manual intervention. As the setting time for the alginate paste is very low, manual dispensing of the alginate paste may cause the alginate paste to set prior to its use. Further, precise amounts of the alginate powder and liquid must be selected for mixing to obtain the alginate paste, having a desired consistency. Furthermore, setting time of the alginate paste depends upon the quantity of alginate powder, quantity of liquid, mixing duration, temperature of the liquid and environmental conditions. Therefore, a need exists for a mixing and dispensing apparatus to seek to mitigate one or more of the above disadvantages.

SUMMARY

The one or more shortcomings of the prior art are overcome by a mixing and dispensing apparatus as claimed and additional advantages are provided through the provisions as claimed in the present disclosure. Other embodiments and aspects of the disclosure are described in detail herein.

The present disclosure provides the mixing and dispensing apparatus, comprising a mechanism, an actuation device, and an injection unit.

The apparatus includes the mechanism that is configured to hold and rotate a cartridge having a powder material, about a primary axis of rotation for a pre-determined time duration and speed. Further, the mechanism comprises a cartridge holder that is configured to receive the cartridge. The cartridge holder having the cartridge is configured to rotate about a secondary axis of rotation that is radially offset from the primary axis while the cartridge is rotated about the primary axis of rotation. The mechanism is further configured to uniformly mix the powder material with the fluid to obtain a semi-liquid form of the powder material.

The apparatus comprising the actuation device is configured to perform a piercing stroke and a dispensing stroke. The injection unit is disposed within the actuation device for injecting a pre-determined quantity of fluid into the cartridge after carrying out the piercing stroke. Further, during the piercing stroke, one end of the cartridge is pierced by the actuation device and during an injection stroke, the fluid is injected into the cartridge. Furthermore, during the dispensing stroke the cartridge is compressed to dispense the semi-liquid form of the powder material through other end of the cartridge.

In an embodiment, the mechanism comprises a planetary gear train arrangement for rotating the cartridge about the primary axis of rotation and the secondary axis of rotation. In an embodiment, the mechanism is driven by a rotary actuator.

Further, the apparatus comprises a brake unit. The brake unit is configured to position the mechanism at a predetermined position after the rotation of the mechanism. The mechanism is positioned such that, the cartridge is linearly aligned with the actuation device prior to receiving the piercing stroke from the actuation device.

In an embodiment, the apparatus comprises a plurality of resilient members disposed below the mechanism, for dampening any vibrations caused during rotation of the mechanism.

In an embodiment, the mechanism comprises an open vessel which is disposed above the mechanism and is configured to rotate along the primary axis of rotation.

In an embodiment, the actuation device comprises at least a first, and a second linear actuator. The first linear actuator is configured to provide the piercing stroke and the injection stroke, and the second linear actuator is configured to provide the dispensing stroke for dispensing the semi-liquid form of the powder through other end of the cartridge.

In an embodiment, the cartridge holder is a receptacle formed on the vessel, for receiving the cartridge. Further, the cartridge holder is configured to rotate along the secondary axis of rotation.

Further, the apparatus comprises a dispensing unit, which is disposed below the cartridge holder. The dispensing unit is configured to receive the semi-liquid form of the powder material during the dispensing stroke through a bottom opening provided on the cartridge holder. In another embodiment, the semi-liquid form of the powder is received on a tray of the dispensing unit.

In an embodiment, the other end of the cartridge is provided with a fragile portion that breaks open during the dispensing stroke to dispense the semi-liquid form of the powder material.

In an embodiment, the dispensing unit is configured to vibrate the tray, causing deaeration of the semi-liquid form of the powder material.

Further the injection unit is in fluid communication with at least one fluid reservoir and a pump to supply a pre-determined amount of fluid into the cartridge.

In an embodiment, the fluid reservoir is integrated with a heat exchanger for maintaining a pre-determined temperature of the fluid which is to be injected into the cartridge. In another embodiment, the heat exchanger is coupled with a sensor to sense the fluid temperature and a level sensor to sense the fluid level.

In an embodiment, the apparatus further comprises a scanning device for scanning an identification code associated with the powder material, wherein the identification code is provided on the cartridge.

In an embodiment, the apparatus further comprises a control unit coupled with the scanning device, wherein the control unit is configured to receive the identification code associated with the powder material. Further, the control unit is configured to determine one or more parameters based on the identification code. The parameters include temperature and amount of fluid to be injected, speed and time duration of rotation of the mechanism. In another embodiment, the control unit is configured to generate one or more commands to the heat exchanger for controlling the fluid temperature, to the fluid reservoir for regulating the supply of the fluid, and to the mechanism for rotating the cartridge to uniformly mix the powder material with the fluid to obtain the semi-liquid form of the powder material.

In an embodiment, the apparatus further comprises a display unit, wherein the display unit is coupled with the control unit. The display unit is configured to receive and display the parameters from the control unit and receive the parameters as inputs from a user to modify the parameters determined by the control unit.

In another aspect, of the present disclosure provides a method of mixing and dispensing a semi-liquid form of a powder material. The method of the present disclosure includes placing a cartridge filled with the powder material, in a cartridge holder. Further, one end of the cartridge is pierced, by an actuation device. After the piercing, the fluid is injected into the cartridge through one end of the cartridge, by an injection unit. Further, the cartridge is rotated by a mechanism, about a primary axis of rotation and a secondary axis of rotation to mix the powder material with the injected fluid. The cartridge is rotated to obtain the semi-liquid form of the powder material. Thereafter, the cartridge is compressed, by the actuation device, to dispense the semi-liquid form of the powder material through other end of the cartridge. Further, the dispensed semi-liquid form of the powder material is received by a dispensing unit, onto a tray placed in the dispensing unit.

The method of mixing and dispensing further comprises scanning of an identification code provided on the cartridge, by a scanner.

In another embodiment, based on the identification code, one or more parameters including temperature and amount of the fluid to be injected, speed and time duration of rotation of the mechanism are received and determined, by a control unit.

In another embodiment, one or more commands are generated, by the control unit, for controlling the fluid temperature by a heat exchanger, to a fluid reservoir for regulating the supply of the fluid, and to rotate the cartridge placed in the mechanism to uniformly mix the powder material with the fluid to obtain the semi-liquid form of the powder material.

In an embodiment, the received parameters from the control unit is displayed, by a display unit. In another embodiment, the display unit receives the parameters as user inputs from a user to modify the parameters determined by the control unit.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the apparatus and methods illustrated herein may be employed without departing from the principles of the disclosure described herein

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that an apparatus or method that comprises a list of components or steps does not include only those components or steps but may include other components or steps not expressly listed or inherent to such setup or device or process. In other words, one or more elements in a system or apparatus proceeded by "comprises . . . a" does not, without more constraints, preclude the existence of other elements or additional elements in the system or apparatus.

Embodiments of the present disclosure relates to a mixing and dispensing apparatus. Referring to FIG. 1 to FIG. 5, the mixing and dispensing apparatus 100 (hereby referred to as "the apparatus 100") comprises a mechanism 20, an actuation device 30 and an injection unit 40.

The apparatus 100 is configured to mix a powder material with a fluid to obtain a semi-liquid form of the powder material. The apparatus 100 may employ a cartridge 10 shown in FIG. 5 for operation. The cartridge 10 is substantially a closed container having a pre-determined quantity of powder material which is to be mixed with the fluid. The cartridge 10 is defined by two opposite ends 11, 12. Through one end 11 of the cartridge 10 the fluid may be added and through the other end 12 a mixed form of the powder material and the fluid i.e., the semi-liquid form of the powder material may be dispensed. In an embodiment, the one end 11 of the cartridge 10 is provided with a sealable opening 13 through which the fluid is added. In another embodiment, the sealable opening 13 comprises an aperture which is preferably sealed with either an adhesive strip or a retractable flap, or any a breakable covering.

Figure 5:
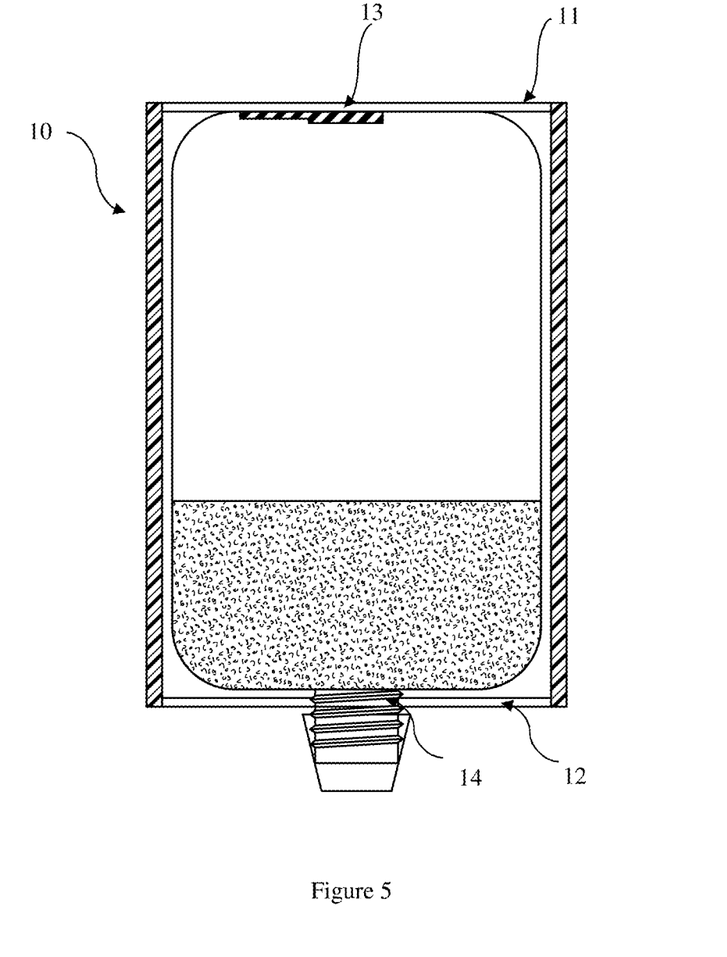
FIG. 5 illustrates a schematic view of a cartridge, in accordance with an embodiment of the present disclosure.

In an embodiment, the other end 12 of the cartridge 10 is provided with a fragile portion 14, which breaks open upon an application of force, to dispense the semi-liquid form of the powder material. In another embodiment, a predetermined cross-section area of the other end 12 of the cartridge 10 may be pre-perforated to easily open when subjected to an external force.

In an embodiment, the cartridge 10 can be of any shape, selected from the group consisting of rectangle, square, circular or any polygonal shape with a hollow configuration to store the powder material. In another embodiment, the cartridge 10 is preferably made of plastic or any recyclable material. The cartridge 10 can also be made of any material selected from the group consisting of metallic, non-metallic, polymeric material and any combination thereof.

Figure 1:
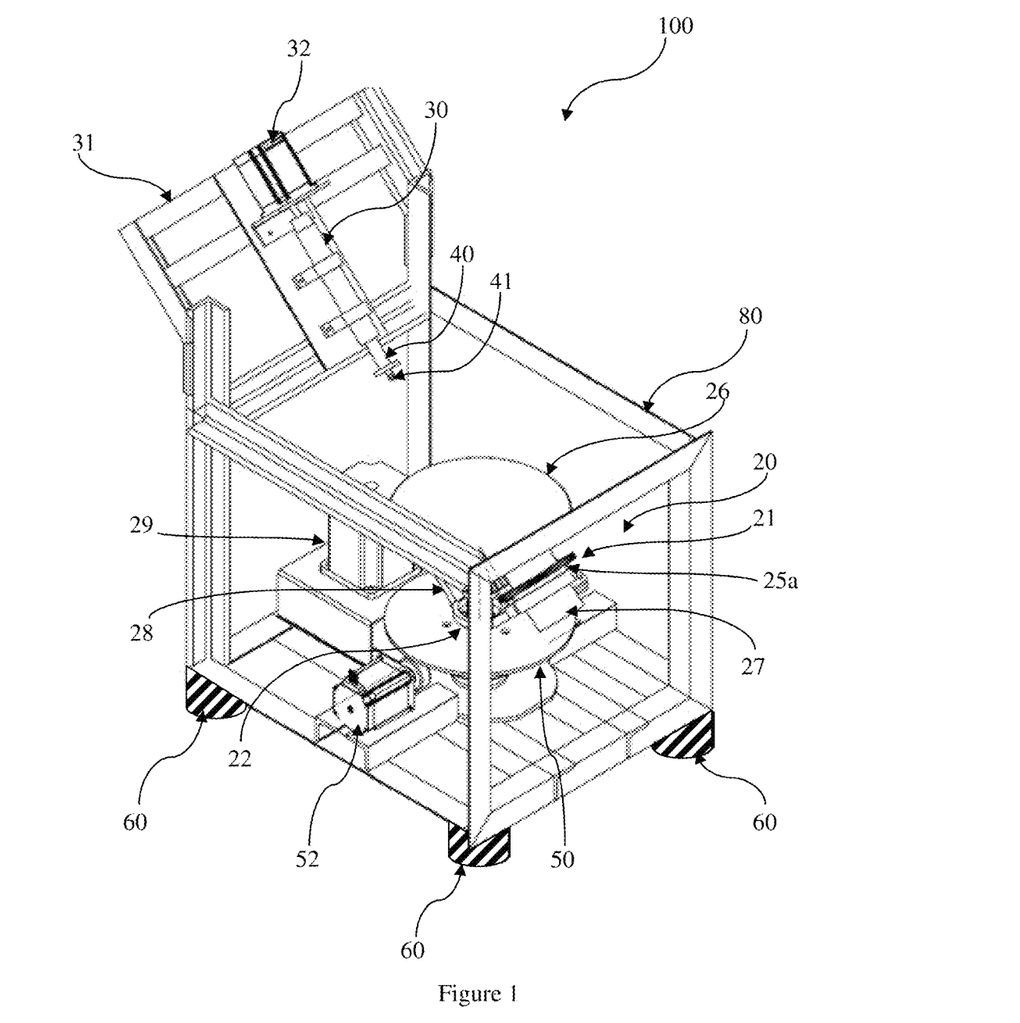
FIG. 1 illustrates a perspective view of a mixing and dispensing apparatus, in accordance with an embodiment of the present disclosure.
Figure 2:
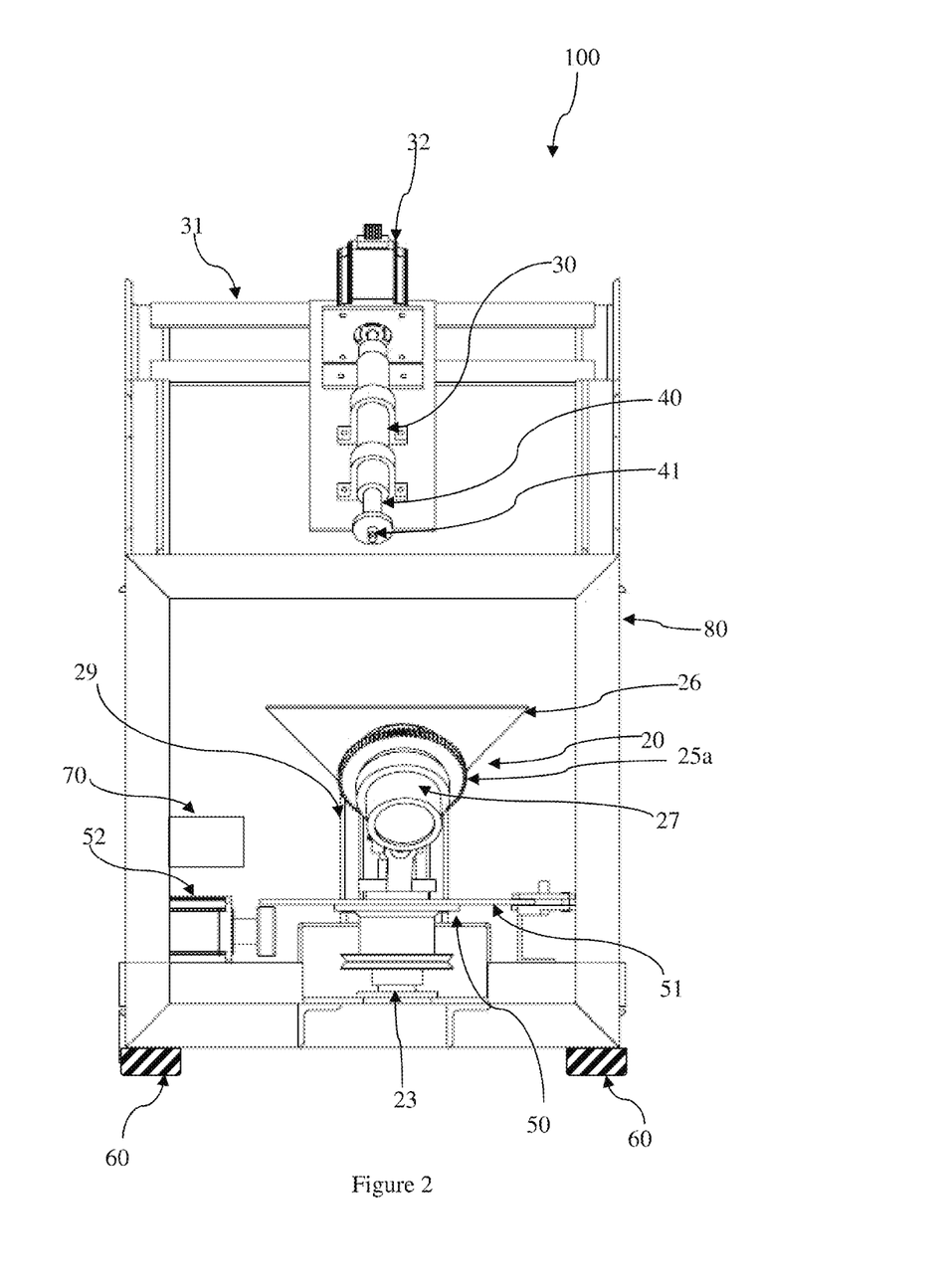
FIG. 2 illustrates another perspective view of the mixing and dispensing apparatus of FIG. 1.

Now referring to FIG. 1, the apparatus 100 comprises a frame structure 80, that provides support for various components of the apparatus 100. The frame structure 80 establishes a positional relationship of each of the components of the apparatus to one another to provide the utility generated by the apparatus. In an embodiment, the frame structure 80 may be constructed and made of durable material to provide support for heavier components of the apparatus.

Figure 3:
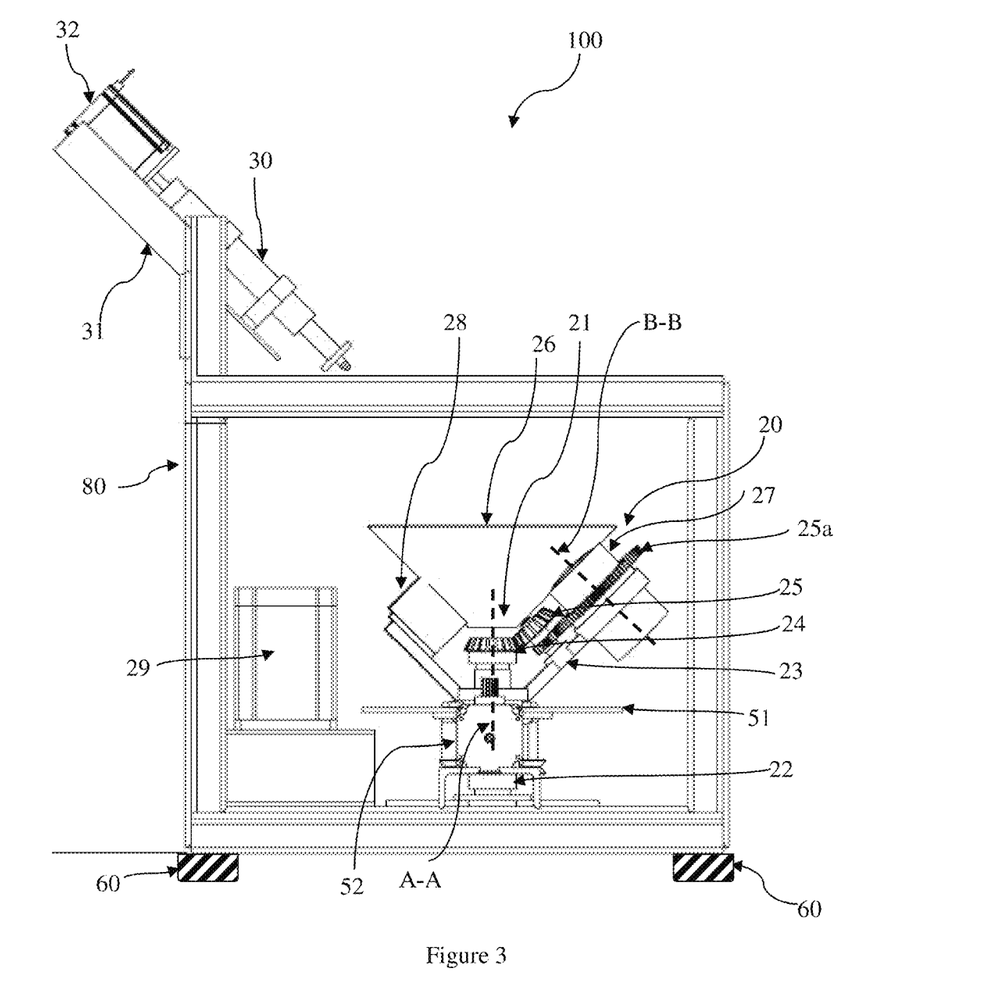
FIG. 3 illustrates a side view of the mixing and dispensing apparatus of FIG. 1.
Figure 4:
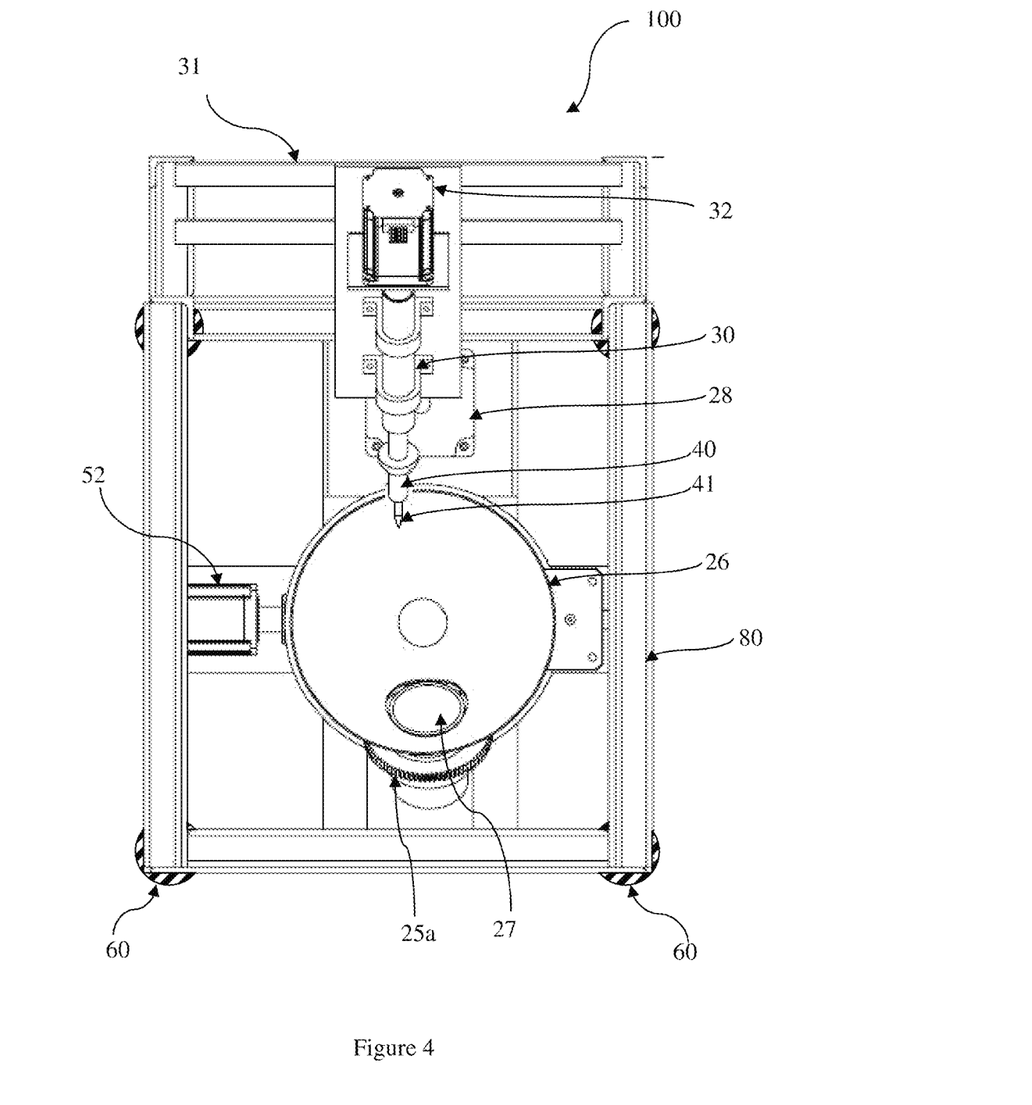
FIG. 4 illustrates a top view of the mixing and dispensing apparatus of FIG. 1.

Referring to FIG. 3, the apparatus 100 further includes the mechanism 20 that is configured to hold and rotate the cartridge 10 about a primary axis A-A, of rotation for a pre-determined time duration and speed. Further, the cartridge 10 is configured to rotate about a secondary axis B-B of rotation that is radially offset from the primary axis A-A while the cartridge 10 is rotated about the primary axis A-A of rotation. The rotation of the mechanism 20 about the primary axis A-A of rotation and the secondary axis B-B of rotation facilitates the uniform mixing of the powder material with the fluid to obtain a semi-liquid form of the powder material in the cartridge 10. In an embodiment, the mechanism 20 comprises a planetary gear train arrangement 21 for rotating the cartridge 10 about the primary axis A-A of rotation and the secondary axis B-B of rotation. The planetary gear arrangement 21 comprises of a primary gear 24, a secondary gear 25 and a tertiary gear 25a, wherein the primary gear 24 is mounted on a primary shaft 22 that is disposed about vertical axis from the ground and supported on the frame structure 80. Further, the secondary gear 25 is configured to be in constant mesh with the primary gear 24. In an embodiment, the secondary gear 25 is mounted on a secondary shaft 23, wherein the secondary shaft 23 is aligned radially offset with respect to the vertical axis of the primary shaft 22. In an embodiment, the tertiary gear 25a is configured to rotate along the secondary axis B-B of rotation which is parallel to the axis of the rotation of the secondary gear 25. In another embodiment, the primary gear 24 is configured to rotate about vertical axis of motion i.e., primary axis A-A with respect the ground surface. Subsequently, the tertiary gear 25a in constant mesh with the secondary gear 25 is configured to rotate about the secondary axis B-B of rotation, and further the secondary gear 25 which is in mesh with primary gear 24 is configured to revolve around the primary gear 24. The planetary gear arrangement 21 may be a bevel gear arrangement. In an embodiment, any suitable gear or mechanical arrangements may be used to rotate the cartridge 10 in the primary axis A-A and the secondary axis B-B of rotation.

In an embodiment, the mechanism 20 comprises an open vessel 26 which is disposed above the mechanism 20. The open vessel 26 is coupled to the primary shaft 22, wherein the shaft 22 is configured to rotate along the primary axis A-A of rotation and the open vessel 26 rotates with the shaft 22. Further, the mechanism 20 comprises a cartridge holder 27 coupled to the secondary shaft 23, wherein the cartridge holder 27 is disposed through a receptacle formed on the vessel 26. The cartridge holder 27 has a top opening configured to receive and position the cartridge 10. In an embodiment, the cartridge holder 27 is configured to rotate along the secondary axis B-B of rotation which is parallel to the axis of the rotation of the secondary gear 25. In an embodiment, the tertiary gear 25a is circumferentially disposed on the cartridge holder 27, wherein the tertiary gear 25a is in meshing engagement with the secondary gear 25. Further, the tertiary gear 25a rotates due to the rotation of the secondary gear 25, wherein the secondary gear 25 rotates die to the rotation of the primary gear 24, thereby rotating the cartridge holder 27.

During an operative configuration of the mechanism 20, contents (such as powder material, liquid or semi-liquid form of powder material) present in the cartridge 10 may spill over the mechanism 20, thereby choking and reducing the service life of components of the mechanism 20. Thus, to prevent the spillage of the contents on the mechanism 20, the cartridge holder 27 is projected above the receptacle, such that the opening of the cartridge holder 27 is disposed within an interior of the vessel 26. Thereby, the vessel 26 prevents spill over of the contents over the mechanism 20. In an embodiment, the mechanism 20 is supported on an inclined bracket 28, wherein the inclined bracket 28 is attached to the frame structure 80.

In an embodiment, the mechanism 20 is driven by a rotary actuator. In an embodiment, the rotary actuator may be a motor, hydraulic actuator, pneumatic actuator and the like. The rotary actuator may be coupled to the mechanism 20 through a belt drive or a pulley drive or a gear drive to enable rotation of the primary shaft 22. In another embodiment, the rotary actuator can be selected from the group consisting of DC motors and AC motors. Further, if motors such as brushless direct current motor (BLDC motor) is used as the rotary actuator 29, application of the belt and pulley drives can be eliminated by directly coupling the rotary actuator 29 to the mechanism 20.

The apparatus further includes the actuation device 30 that is configured to perform a piercing stroke and a dispensing stroke. The actuation device 30 is supported on the frame structure 80 by a mounting bracket 31, wherein the mounting bracket 31 is either thermally joined or mechanically joined to the frame structure 80 by a plurality of fasteners. Further, the actuation device 30 is arranged such that, the actuation device 30 is linearly aligned with the cartridge holder 27.

In an embodiment, the actuation device 30 comprises at least a first and a second linear actuator (not shown in figures). The first linear actuator is configured to perform the piercing stroke and the injection stroke. During the piercing stroke, one end 11 of the cartridge 10 is pierced by the actuation device 30 and during an injection stroke, the fluid is injected into the cartridge 10.

Further, the second linear actuator is configured to perform the dispensing stroke by applying a force on the cartridge 10 positioned in the cartridge holder 27, thereby dispensing the semi-liquid form of the powder through the fragile opening 14 of the cartridge 10. Furthermore, the dispensing stroke compresses the cartridge 10 to squeeze and dispense the semi-liquid form of the powder through the other end 12 of the cartridge 10.

In an embodiment, the actuation device 30 is an elongate hollow cylindrical shaft, wherein the injection unit 40 is disposed within the hollow cylindrical shaft. In another embodiment, the injection unit 40 is having a configuration of an elongated cylinder shaft. Further, the actuation device 30 comprises a proximal end and a distal end, wherein the proximal end is removably attached to the mounting bracket and is coupled with the linear actuator motor 32. In another embodiment, the distal end has tapered configuration, that facilitates the piercing stroke and the injection stroke. In an embodiment, a spout 41 is provided at the distal end that facilitates injection of fluid in the cartridge 10.

During injection stroke a pre-determined quantity of fluid may be injected into the cartridge 10 after carrying out the piercing stroke. Further the injection unit 40 is in fluid communication with at least one fluid reservoir and a pump, for supplying pre-determined quantity of fluid into the cartridge 10. In an embodiment, the pump is coupled with the at least one fluid reservoir to supply the fluid, from the fluid reservoir, to be injected into the cartridge 10 via the injection unit 40. The fluid reservoir is integrated with a heat exchanger for maintaining a pre-determined temperature of the fluid which is to be injected into the cartridge 10.

In an embodiment, the apparatus further comprises a scanning device 70 for scanning an identification code associated with the powder material, wherein the indentification code is provided on the cartridge 10. The identification code may be an optical machine-readable code, RFID tag, QR code or a bar code. The identification code represents and provides data related to the powder material such as quantity, quality, type of powder material, packaging date, expiry date and any other information related to the powder material.

Further, the apparatus comprises a control unit (not shown in figures) that is coupled with the scanning device 70, wherein the control unit is configured to receive the identification code associated with the powder material. Further, the control unit is configured to determine one or more parameters based on the identification code. The parameters include temperature and amount of fluid to be injected into the cartridge 10, speed and time duration of rotation of the mechanism 20.

Further, the control unit is configured to generate one or more commands, wherein the generated commands are sent; to the heat exchanger for controlling the fluid temperature; to the fluid reservoir for regulating the supply of the fluid; to the scanning device 70 for reading the identification code on the cartridge 10; and to the mechanism 20 for rotating the cartridge 10 to mix the powder material with the fluid. In an embodiment, the heat exchanger is coupled with a sensor to sense the fluid temperature and a level sensor to sense the fluid level in the reservoir. Further, the sensor coupled to the heat exchanger, and the level sensor each are configured to generate a signal, which is received by the control unit. Further, the apparatus comprises a display unit, wherein the display unit is coupled with the control unit. The display unit is configured to receive and display the temperate of the fluid, level of fluid, data related to the cartridge 10, speed and duration of rotation of the mechanism 20. Further, the display unit is configured to receive parameters as inputs from a user to modify the parameters determined by the control unit. The parameters received as inputs from the user are temperate of the fluid, quantity of fluid injected into the cartridge 10, data related to the cartridge 10, speed and duration of rotation of the mechanism 20 or cut off rotation of the mechanism 20. Further, the cut off time includes, the time taken for; injecting the fluid into the cartridge 10, rotating the mechanism 20 for mixing the powder material and the fluid, for performing the dispensing stroke. In an embodiment, the commands generated by the control unit are based on the user inputs and/or information received from the scanning device 70 and the sensors.

In an embodiment, the apparatus further comprises a brake unit 50. The brake unit 50 is coupled to the frame structure 80 and is configured to angularly position the mechanism 20 at a predetermined position before and after the rotation of the mechanism 20. The mechanism 20 is positioned such that, the cartridge 10 is linearly aligned with the actuation device 30 prior to receiving the piercing stroke, injecting stroke or dispensing stroke from the actuation device 30. The brake unit 50 can be any conventional braking system used to arrest the motion of the rotary actuator 29, thereby positioning the mechanism 20. In an embodiment, the brake unit 50 includes, a brake plate, a brake disc 51 and a positioning motor 52, wherein the during the actuation of the brake unit 50 the motion of the positioning motor 52 and the rotary actuator 29 is arrested. In another embodiment, during the operation of the positioning motor 52, the control unit is configured to disengage the rotary actuator 29.

In an embodiment, the apparatus comprises a plurality of resilient members (not shown in figures) that is disposed below the mechanism 20. The resilient members are configured to dampen any vibrations caused during rotation of the mechanism 20. In an embodiment, the resilient members may be selected from the group consisting of damping pads, compression spring, helical compression springs, helical extension spring, disc springs, conical springs, torsion springs, constant force springs, leaf springs and any other element which is configured to resists the load of the apparatus 100 and damp the vibrations during the rotation.

Further, the apparatus 100 comprises a dispensing unit (not shown in figures), which is disposed below the cartridge holder 27. The dispensing unit is configured to receive the semi-liquid form of the powder material during the dispensing stroke through a bottom opening provided on the cartridge holder 27. Further, the semi-liquid form of the powder material is received on a tray of the dispensing unit. In an embodiment, the tray may also be a dental impression mould. Further, the dispensing unit is configured to vibrate which in turn vibrates the tray containing the semi-liquid form of the powder material. In an embodiment, the vibration of the tray causes deaeration of the semi-liquid form of the powder material, and provides a consistent material.

In an embodiment, the actuation device 30, the mechanism 20, the injection unit 40, the brake unit 50, the scanning device 70, the control unit and the display unit are powered by any power source or a battery.

In another embodiment, the apparatus is enclosed by an outer casing mounted to the frame 80 to completely house the apparatus.

In yet another embodiment, a plurality of damping pads 60 is configured below the frame structure 80, wherein the plurality of damping pads 60 is configured to resist the impact loads, shocks and the vibrations generated during the operative configuration of the apparatus In an operative configuration, the actuation device 30 and the injection unit 40 can be actuated by hydraulic, pneumatic, electrical means and any combination thereof.

The working of the apparatus is as follows; initially, the cartridge 10 is placed in the cartridge holder 27. Then, the scanning device 70 scans the identification code provided on the cartridge 10 and displays the data associated with the identification code on the display unit. Followed by which the user inputs are provided by the user on the display unit. Further, upon receiving the user inputs a set of commands are sent by the control unit to the actuation device 30, the injection unit 40, the heat exchanger, the fluid reservoir, and the mechanism 20. Then, the actuation device 30 performs the piercing stroke, thereby piercing one end 11 of the cartridge 10. After performing piecing stroke, the injection unit 40 injects a pre-determined quantity and temperature of fluid into the cartridge 10, depending on the commands. The mechanism 20 is then configured to rotate about the primary axis A-A and the secondary axis B-B of rotation by the rotary actuator 29. The rotation of the mechanism 20 facilitates uniform mixing of the powder material and the fluid. After the mechanism 20 is rotated for a predetermined speed and duration the brake unit 50 arrests the rotation of the rotary actuator 29 and positions the mechanism 20 in line with the actuation device 30 and the dispensing unit. After the positioning of the mechanism 20, the dispensing stroke may be performed by the actuation device 30 in order to compress and dispense the semi-liquid form of the powder material through the other end 12 of the cartridge 10. The dispensed semi-liquid form of the powder material is received in the tray placed in the dispensing unit. Vibrations produced by a vibrator coupled to the dispensing unit aids in vibrating the tray placed on the dispensing unit, causing deaeration of the semi-liquid form of the powder material. After the cartridge 10 is compressed and squeezed by the actuation device 30, the cartridge 10 can be disposed and replaced by a new cartridge 10 for the next cycle of use.

In another aspect, of the present disclosure provides a method of mixing and dispensing a semi-liquid form of a powder material. The method of the present disclosure includes placing a cartridge 10, in a cartridge holder 27, wherein the cartridge 10 is filled with the powder material. Further, one end 11 of the cartridge 10 is pierced, by the actuation device 30. After the piercing, the fluid is injected into the cartridge 10 through one end 11 of the cartridge 10, by an injection unit 40.

Further, the cartridge 10 is rotated by the mechanism 20, about a primary axis A-A of rotation and a secondary axis B-B of rotation to mix the powder material with the injected fluid. The cartridge 10 is rotated to obtain the semi-liquid form of the powder material.

Thereafter, the cartridge 10 is compressed, by the actuation device 30, to dispense the semi-liquid form of the powder material through other end 12 of the cartridge 10. Further, the dispensed semi-liquid form of the powder material is received by a dispensing unit, onto a tray placed in the dispensing unit.

The method of mixing and dispensing further comprises scanning of an identification code provided on the cartridge 10, by a scanner.

In another embodiment, based on the identification code, one or more parameters including temperature and amount of the fluid to be injected, speed and time duration of rotation of the mechanism 20 are received and determined, by a control unit.

In another embodiment, one or more commands are generated, by the control unit, for controlling the fluid temperature of a heat exchanger, for regulating the supply of the fluid to a fluid reservoir, and to rotate the cartridge 10 placed in the mechanism to uniformly mix the powder material with the fluid to obtain the semi-liquid form of the powder material.

In an embodiment, the received parameters from the control unit is displayed, by a display unit. In another embodiment, the display unit receives the parameters as user inputs from a user to modify the parameters determined by the control unit.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

In the detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

In an embodiment, the present disclosure provides a mixing and dispensing apparatus 100 which provides uniform mixing of a powder material with a fluid to obtain a semi-liquid form of powder material.

The apparatus 100 of the present disclosure provides a homogenous mixture which is also deaerated.

In an embodiment, the present disclosure provides a mixing and dispensing apparatus 100 which eliminates manual mixing and dispensing of the semi-liquid form of the powder material.

The apparatus 100 facilitates ease of operation, and can be used by any unskilled user The apparatus 100 of the present disclosure reduces the time consumed for mixing and dispensing. The apparatus 100 of the present disclosure can be applicable in healthcare industries, chemical industries, pharma industries, food processing units and any other industry depending the upon the application.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 10 | Cartridge |
| 11 | One end |
| 12 | Other end |
| 13 | Sealable opening |
| 14 | Fragile portion |
| 20 | Mechanism |
| 21 | Planetary gear train arrangement |
| 22 | Primary shaft |
| 23 | Secondary shaft |
| 24 | Primary gear |
| 25 | Secondary gear |
| 25a | Tertiary gear |
| 26 | Vessel |
| 27 | Cartridge holder |
| 28 | Inclined bracket |
| 29 | Rotary actuator |
| 30 | Actuation device |
| 31 | Mounting bracket |
| 32 | Linear actuator motor |
| 40 | Injection unit |
| 41 | Spout |
| 50 | Brake unit |
| 51 | Brake disc |
| 52 | Positioning motor |
| 60 | Damping pads |
| 70 | Scanning device |
| 80 | Frame structure |
| 100 | Apparatus |
| A-A | Primary axis |
| B-B | Secondary axis |

The invention claimed is:

1. A mixing and dispensing apparatus, comprising:
a mechanism configured to hold and rotate a cartridge having a powder material, about a primary axis of rotation for a pre-determined time duration and speed, wherein the mechanism comprises a cartridge holder configured to receive the cartridge and to rotate about a secondary axis of rotation that is radially offset from the primary axis while the cartridge is rotated about the primary axis of rotation, wherein the mechanism is configured to uniformly mix the powder material with a fluid to obtain a semi-liquid form of the powder material;
an actuation device configured to perform a piercing stroke and a dispensing stroke; and
an injection unit disposed within the actuation device for injecting a pre-determined quantity of fluid into the cartridge after carrying out the piercing stroke;
wherein during the piercing stroke, one end of the cartridge is pierced by the actuation device and during an injection stroke, the fluid is injected into the cartridge, wherein during the dispensing stroke the cartridge is compressed to dispense the semiliquid form of the powder material through an opposing end of the cartridge.

2. The mixing and dispensing apparatus as claimed in claim 1, wherein the mechanism comprises a planetary gear train arrangement for rotating the cartridge about the primary axis of rotation and the secondary axis of rotation, further wherein the mechanism is driven by a rotary actuator.

3. The mixing and dispensing apparatus as claimed in claim 1, further comprises a brake unit configured to position the mechanism at a predetermined position after the rotation of the mechanism such that the cartridge is linearly aligned with the actuation device prior to receiving the piercing stroke from the actuation device.

4. The mixing and dispensing apparatus as claimed in claim 1, further comprises a plurality of resilient members disposed below the mechanism for dampening vibrations caused during rotation of the mechanism.

5. The mixing and dispensing apparatus as claimed in claim 1, wherein the mechanism comprises an open vessel, disposed above the mechanism, configured to rotate along the primary axis of rotation.

6. The mixing and dispensing apparatus as claimed in claim 5, wherein the cartridge holder is a receptacle formed on the open vessel, for receiving the cartridge and to rotate along the secondary axis of rotation.

7. The mixing and dispensing apparatus as claimed in claim 6, further comprises a dispensing unit, disposed below the cartridge holder, configured to receive the semi-liquid form of the powder material during the dispensing stroke through a bottom opening provided on the cartridge holder such that the semi-liquid form of the powder is received on a tray of the dispensing unit.

8. The mixing and dispensing apparatus as claimed in claim 7, wherein the dispensing unit is configured to vibrate the tray, causing deaeration of the semi-liquid form of the powder material.

9. The mixing and dispensing apparatus as claimed in claim 1, wherein the actuation device comprises at least a first, and a second linear actuator, wherein the first linear actuator is configured to provide the piercing stroke and the injection stroke, and the second linear actuator is configured to provide the dispensing stroke for dispensing the semi-liquid form of the powder through the opposing end of the cartridge.

10. The mixing and dispensing apparatus as claimed in claim 1, wherein the opposing end of the cartridge is provided with a fragile portion that breaks open during the dispensing stroke, to dispense the semi-liquid form of the powder material.

11. The mixing and dispensing apparatus as claimed in claim 1, wherein the injection unit is in fluid communication with at least one fluid reservoir and a pump to supply a predetermined amount of the fluid into the cartridge.

12. The mixing and dispensing apparatus as claimed in claim 11, wherein the fluid reservoir is integrated with a heat exchanger for maintaining a pre-determined temperature of the fluid to be injected into the cartridge, wherein the heat exchanger is coupled with a sensor to sense the fluid temperature and a level sensor to sense the fluid level.

13. The mixing and dispensing apparatus as claimed in claim 12, further comprises a scanning device for scanning an identification code associated with the powder material provided on the cartridge.

14. The mixing and dispensing apparatus as claimed in claim 13, further comprises a control unit coupled with the scanning device, configured to:
receive the identification code associated with the powder material;
determine one or more parameters including temperature and amount of fluid to be injected, speed and time duration of rotation of the mechanism, based on the identification code; and
generate one or more commands to the heat exchanger for controlling the fluid temperature, to the fluid reservoir for regulating the supply of the fluid, and to the mechanism for rotating the cartridge to uniformly mix the powder material with the fluid to obtain the semi-liquid form of the powder material.

15. The apparatus as claimed in claim 14, further comprises a display unit coupled with the control unit, configured to receive and display the parameters from the control unit and receive the parameters as inputs from a user to modify the parameters determined by the control unit.

16. A method of mixing and dispensing a semi-liquid form of a powder material, comprising;
placing, a cartridge filled with the powder material, in a cartridge holder;
piercing, by an actuation device, one end of the cartridge;
injecting, by an injection unit, the fluid into the cartridge through one end of the cartridge;
rotating, by a mechanism, the cartridge about a primary axis of rotation and a secondary axis of rotation to mix the powder material with the injected fluid to obtain the semi-liquid form of the powder material;
compressing, by the actuation device, the cartridge to dispense the semi-liquid form of the powder material through an opposing end of the cartridge; and
receiving, by a dispensing unit, the dispensed semi-liquid form of the powder material onto a tray placed in the dispensing unit.

17. The method as claimed in claim 16, further comprising:
scanning, by a scanner, an identification code associated with the power material;
receiving and determining, by a control unit, one or more parameters including temperature and amount of the fluid to be injected, speed and time duration of rotation of the mechanism, based on the identification code;
generating one or more commands, by the control unit, to a heat exchanger for controlling the fluid temperature, to a fluid reservoir for regulating the supply of the fluid, and to the mechanism for rotating the cartridge to uniformly mix the powder material with the fluid to obtain the semi-liquid form of the powder material;
displaying, by a display unit, the received parameter so the control unit; and
receiving, by the display unit, the parameters as inputs from a user to modify the parameters determined by the control unit.

* * * * *